(12) United States Patent
Kondou et al.

(10) Patent No.: US 9,459,410 B2
(45) Date of Patent: Oct. 4, 2016

(54) OPTICAL DEVICE SEALING STRUCTURE AND OPTICAL DEVICE MANUFACTURING METHOD

(75) Inventors: Katsutoshi Kondou, Funabashi (JP); Masaru Shiroishi, Narashino (JP); Kazuhiro Ooto, Narashino (JP)

(73) Assignee: SUMITOMO OSAKA CEMENT CO., LTD. (JP)

(*) Notice: Subject to any disclaimer, the term of this patent is extended or adjusted under 35 U.S.C. 154(b) by 344 days.

(21) Appl. No.: 13/433,474

(22) Filed: Mar. 29, 2012

(65) Prior Publication Data

US 2012/0251770 A1    Oct. 4, 2012

(30) Foreign Application Priority Data

Mar. 31, 2011    (JP) .................................. 2011-079164

(51) Int. Cl.
  *G02B 6/02* (2006.01)
  *G02B 6/36* (2006.01)
  *G02B 6/42* (2006.01)

(52) U.S. Cl.
  CPC ........... *G02B 6/3644* (2013.01); *G02B 6/4248* (2013.01); *Y10T 428/24273* (2015.01)

(58) Field of Classification Search
  CPC .... G02B 6/3644; G02B 6/42; G02B 6/4201; G02B 6/4238; G02B 6/4248; G02B 6/4251; Y10T 428/24273
  USPC ....................................................... 428/131
  See application file for complete search history.

(56) References Cited

U.S. PATENT DOCUMENTS

| | | | | |
|---|---|---|---|---|
| 5,764,833 A | * | 6/1998 | Kakii et al. | 385/54 |
| 6,319,617 B1 | * | 11/2001 | Jin | B23K 35/262 228/101 |
| 2002/0005574 A1 | * | 1/2002 | Zhou | 257/680 |
| 2005/0141836 A1 | * | 6/2005 | Peret | 385/128 |

FOREIGN PATENT DOCUMENTS

| | | |
|---|---|---|
| CN | 1283277 A | 2/2001 |
| JP | B-2800760 | 9/1998 |
| JP | B-2943760 | 8/1999 |
| JP | A-2002-198543 | 7/2002 |
| JP | A-2003-255148 | 9/2003 |
| JP | A-2010-217323 | 9/2010 |

OTHER PUBLICATIONS

Office Action for corresponding JP Application No. 2011-079164 with English Translation (mailed Oct. 1, 2013).
Office Action for Chinese Patent Application No. 201210091554.8 (mailed Oct. 20, 2014).

* cited by examiner

*Primary Examiner* — Nancy Johnson
(74) *Attorney, Agent, or Firm* — Merchant & Gould P.C.

(57) ABSTRACT

To provide an optical device sealing structure capable of simply sealing an optical fiber inserting portion. Provided is a structure that seals an optical device including a metallic case having an optical element disposed therein and an optical fiber inserted through a through hole of the case, wherein a Zn-containing surface is formed on a surface of a bare fiber portion that is formed by partly removing a coating of the optical fiber so as to expose a bare fiber, and wherein an Sn-containing sealing material is charged between the Zn-containing surface and an inner wall of the through hole.

6 Claims, 5 Drawing Sheets

OPTICAL DEVICE SEALING STRUCTURE AND OPTICAL DEVICE MANUFACTURING METHOD

This application claims the benefit of priority to Japanese Patent Application No. 2011-079164, filed 31 Mar. 2011, which is incorporated herein by reference in its entirety.

FIELD OF THE INVENTION

The present invention relates to an optical device sealing structure and an optical device manufacturing method.

BACKGROUND

There is a known optical device in which a through hole is formed in a case accommodating an optical element and an optical fiber inserted through the through hole is connected to the optical element. In the optical device, the through hole through which the optical fiber is inserted is sealed by solder (for example, see Japanese Patent Nos. 2943760 and 2800760).

SUMMARY OF THE INVENTION

In a case where the through hole through which the optical fiber is inserted is sealed by solder, since the adhesion between solder and the optical fiber is not good, the optical device may not be sealed in such a state. For this reason, for the purpose of improving the adhesion of the surface of the optical fiber, an Au film is usually formed thereon by Au-plating. However, in this case, at least the Au film of the end portion of the optical fiber needs to be removed in order to avoid problems in which accuracy of position when disposing the end portion of the optical fiber on a V-groove may be degraded and the end portion of the optical fiber may not be inserted into a fiber inserting hole of a component used to reinforce the adhesion strength when the end portion of the optical fiber is attached to the other component. As a result, time and cost are spent on such an operation.

The invention is directed to solve the problems described above, and an object of the present invention is to provide an optical device sealing structure capable of simply sealing an optical fiber inserting portion and an optical device manufacturing method thereof.

According to an aspect of the invention, there is provided a structure that seals an optical device including a metallic case having an optical element disposed therein and an optical fiber inserted through a through hole of the case, wherein a Zn-containing surface is formed on a surface of a bare fiber portion that is formed by partly removing a coating of the optical fiber so as to expose a bare fiber, and wherein an Sn-containing sealing material filled between the Zn-containing surface and an inner wall of the through hole.

The sealing material may contain Zn.

Zn which is contained in the sealing material may be unevenly distributed on the surface of the bare fiber portion.

According to another aspect of the invention, there is provided a method of manufacturing an optical device, wherein the optical device includes a metallic case having an optical element disposed therein and an optical fiber inserted through a through hole of the case, the method including: forming a bare fiber portion that is formed by partly removing a coating of the optical fiber so as to expose a bare fiber; forming a layer containing Zn on a surface of the bare fiber portion; and inserting the optical fiber into the through hole and filling an Sn-containing sealing material between the Zn-containing surface and an inner peripheral surface of the through hole.

According to another aspect of the invention, there is provided a method of manufacturing an optical device including a metallic case having an optical element disposed therein and an optical fiber inserted through a through hole of the case, wherein the method includes: forming a bare fiber portion that is formed by partly removing a coating of the optical fiber so as to expose a bare fiber; applying Zn-containing solder to the bare fiber portion; forming a Zn-containing surface on a surface of the bare fiber portion by removing the Zn-containing solder; and inserting the optical fiber into the through hole and charging an Sn-containing sealing material between the Zn-containing surface and an inner wall of the through hole.

According to another aspect of the invention, there is provided a method of manufacturing an optical device including a metallic case having an optical element disposed therein and an optical fiber inserted through a through hole of the case, wherein the method includes: forming a bare fiber portion that is formed by partly removing a coating of the optical fiber so as to expose a bare fiber; applying Zn-containing solder to the bare fiber portion; and inserting the optical fiber into the through hole and charging an Sn-containing sealing material between the Zn-containing solder on the bare fiber portion and an inner wall of the through hole.

According to another aspect of the invention, there is provided a method of manufacturing an optical device including a metallic case having an optical element disposed therein and an optical fiber inserted through a through hole of the case, wherein the method includes: forming a bare fiber portion that is formed by partly removing a coating of the optical fiber so as to expose a bare fiber; and inserting the optical fiber into the through hole and charging Zn-containing solder between the bare fiber portion and an inner wall of the through hole.

According to the optical device sealing structure of the invention, the Zn-containing surface which is formed on the surface of the bare fiber portion may be strongly bonded to the Sn-containing sealing material. Thus, since there is no need to use an expensive material such as an Au which is used usually, the cost of component may be reduced and a satisfactory sealing property may be obtained.

Further, according to the optical device manufacturing method of the invention, the through hole is sealed by charging solder thereinto after forming the Zn-containing surface on the surface of the bare fiber portion by dipping or while forming the Zn-containing surface. Accordingly, since the expensive material such as Au which is used usually does not need to be used and a plating does not need to be partly formed on the bare fiber portion using a mask pattern or the like, it is possible to manufacture an optical device that enables a decrease in the cost of members and simplicity in the process and has a satisfactory sealing property.

DETAILED DESCRIPTION OF THE INVENTION

Hereinafter, exemplary embodiments of the invention will be described in detail with reference to the drawings.

Furthermore, hereinafter, a description will be made on the condition that an optical waveguide element is exemplified as an optical element and an optical waveguide package is exemplified as an optical device, but the optical element and the optical device according to the invention are not limited thereto. For example, a laser diode or a package thereof may be exemplified. Alternatively, a photo diode or a package thereof may be exemplified.

(First Embodiment)

Figure 1:
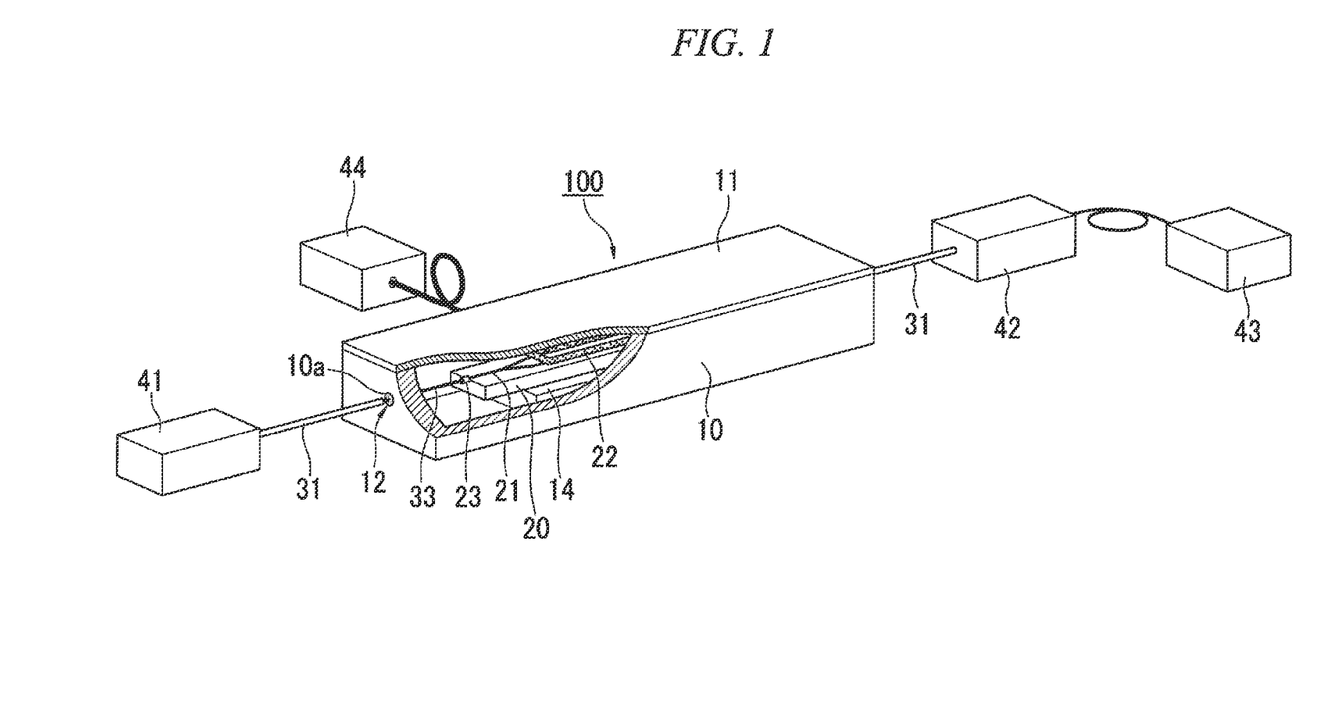
FIG. 1 is a diagram illustrating an optical waveguide package which is an embodiment of an optical device of the invention.
Figure 2A:
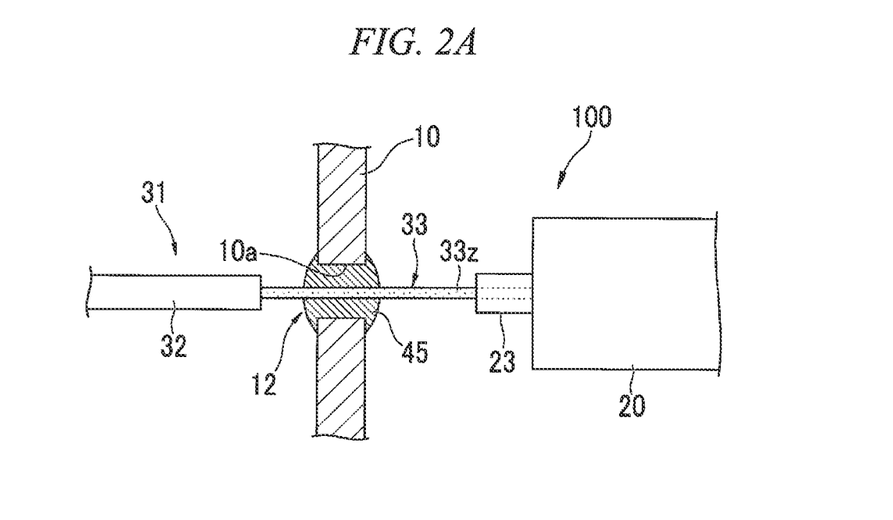
FIGS. 2A to 2C are diagrams illustrating an optical waveguide package sealing structure.
Figure 2B:
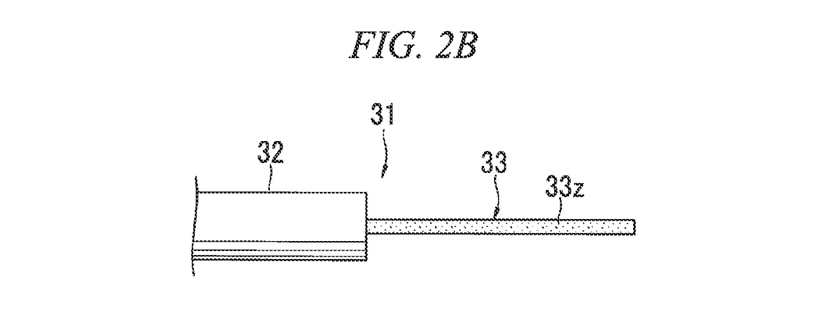
Figure 2C:
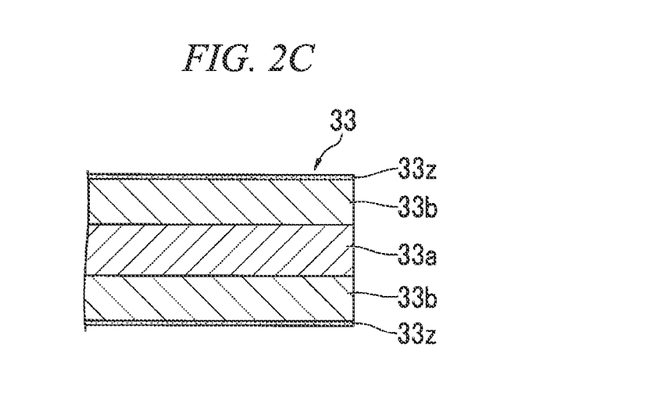

FIG. 1 is a diagram illustrating an optical waveguide package which is an embodiment of an optical device of the invention. FIGS. 2A to 2C are diagrams illustrating an optical waveguide package sealing structure.

An optical waveguide package (an optical device) 100 shown in FIG. 1 includes: a bottomed box-like case 10; an optical waveguide element (an optical element) 20 that is mounted into the case 10; a cover portion 11 that covers the opening end of the case 10 so as to be fixed thereto; and input and output optical fibers 31 that is connected to the optical waveguide element 20.

Furthermore, in FIG. 1, the case 10 and the cover portion 11 are partly notched so that the optical waveguide element 20 mounted therein is visible from the outside.

The optical waveguide element 20 is formed by installing a Mach-Zehnder optical waveguide 21 and an electrode 22 on a substrate which is formed of lithium niobate ($LiNbO_3$; LN), and is fixed to a seat 14 inside the case 10 using a predetermined adhesive.

The input optical fiber 31 is connected to one end portion of the optical waveguide 21 through a fiber fixture 23. The input optical fiber 31 is drawn outward from the inside of the case 10 through a through hole formed in the side wall of the case 10, and is connected to a light source 41. Solder is charged into a through hole 10a of the case 10 through which the optical fiber 31 is inserted, thereby forming a sealing portion 12 that seals the case 10.

On the other hand, as in the above-described case, the output optical fiber 31 is connected to the other end portion of the optical waveguide 21 in the optical waveguide element 20. The output optical fiber 31 is drawn to the outside of the case 10 through the other through hole of the case 10, and as in the case of the input optical fiber 31, solder is charged into the other through hole of the case 10 so as to seal the through hole. Then, the output optical fiber 31 is connected to the optical receiver 42. Furthermore, the optical receiver 42 is connected to a measuring instrument 43 through an interconnection. Further, a driving circuit 44 is connected to the electrode 22 of the optical waveguide element 20 through an RF connector and an interconnection.

With such a configuration, the optical waveguide element 20 functions as a light intensity modulator. That is, a light is input from the input optical fiber 31 to the input portion of the substrate. The light is phase modurated by the electrode 22 while the light is branched into a predetermined number of paths and propagates in the optical waveguide 21, and then the light is combined again in the output unit. A predetermined modulated signal voltage is applied to the electrode 22, an electric field based on the modulated signal voltage is applied into the substrate (the portion of the optical waveguide 21), and then a change in the refractive index according to the modulated signal is caused through the electro-optical effect. Since the lights which propagate in the branched optical waveguides 21 are combined after the phase modulation due to the change in the refractive index, an intensity-modulated light is obtained.

FIG. 2A is a diagram magnifying the sealing portion 12 shown in FIG. 1. FIG. 2B is a diagram illustrating the structure of the end portion of the optical fiber 31. FIG. 2C is a cross-sectional view illustrating the end portion of the optical fiber 31.

In the embodiment, in the optical fiber 31 which is connected to the optical waveguide package 100, as shown in FIG. 2B, a coating 32 of the end portion thereof is removed, thereby forming a bare fiber portion 33 in which the bare fiber (a core 33a and a clad 33b) of the optical fiber is exposed. Further, in the case of the embodiment, as shown in FIG. 2C, a Zn film (Zn-containing surface) 33z which contains at least Zn is formed on the surface of the bare fiber portion 33.

The bare fiber portion 33 is inserted through the through hole 10a formed in the case 10, and the end portion of the bare fiber portion 33 is inserted into a fiber fixture 23 of the optical waveguide element 20. In the through hole 10a through which the bare fiber portion 33 is inserted through, a soldering material (a sealing material) 45 is charged between the Zn film 33z of the surface of at least the bare fiber portion 33 and the inner wall of the through hole 10a, thereby forming a sealing portion 12 that seals the through hole 10a.

The soldering material 45 which is charged into the sealing portion 12 is solder containing at least Sn. For example, Sn—Ag-based solder, Sn—In-based solder, Sn—Ag—Cu-based solder, Sn—Cu-based solder, Sn—Ag—In-based solder, Sn—Bi-based solder, Sn—Zn—Bi-based solder, Sn—Zn—Al-based solder, or the like may be used.

According to the sealing structure of the embodiment with the above-described configuration, since the Zn film 33z is formed on the surface of the bare fiber portion 33 of the optical fiber 31, it is possible to obtain a high adhesion property between the Zn film 33z and the soldering material 45. Accordingly, the sealing portion 12 with a satisfactory sealing property may be formed.

More specifically, since the Zn film 33z contains Zn which is covalently bonded to oxygen (O) of $SiO_2$ which is a component of the bare fiber portion 33, the Zn film 33z is strongly bonded to the surface of the bare fiber portion 33. Furthermore, since Sn which is contained in the soldering material 45 is metallically bonded to a part of Zn of the Zn film 33z, the Zn film 33z and the soldering material 45 are strongly bonded to each other. With the above-described configuration, it is considered that a satisfactory sealing property is obtained between the bare fiber portion 33 and the soldering material 45.

[Manufacturing Method]

Next, a method of manufacturing the optical waveguide package 100 will be described with reference to FIG. 3.

Figure 3:
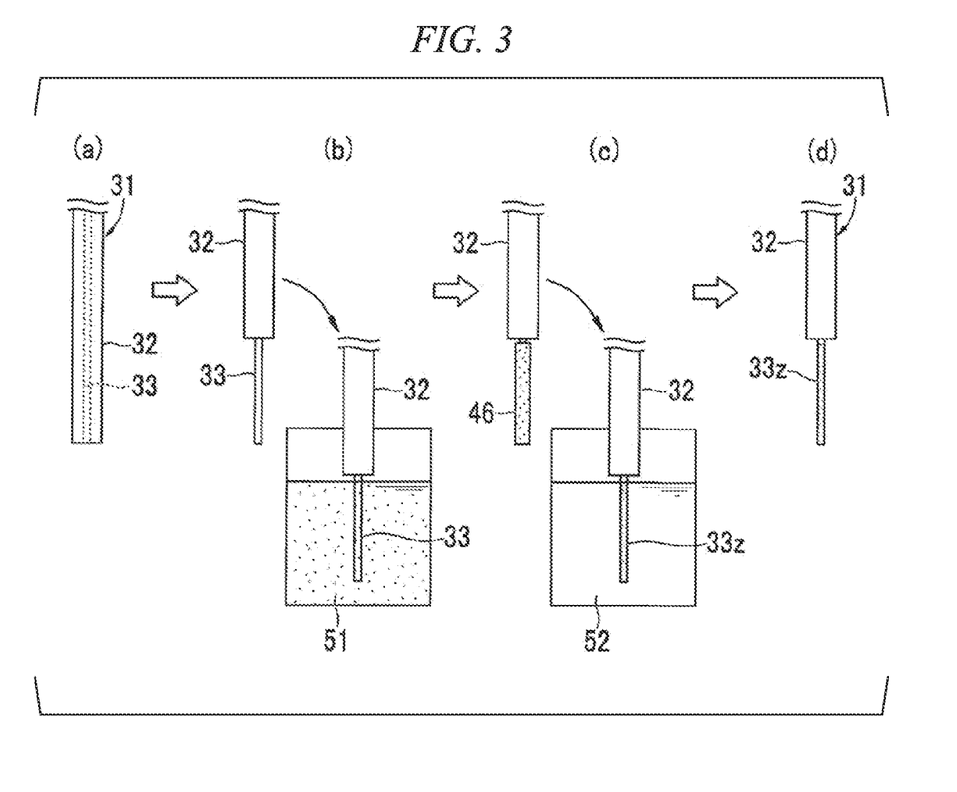
FIG. 3 is diagrams illustrating an optical waveguide package manufacturing method according to a first embodiment.

FIG. 3 is a diagrams illustrating the optical waveguide package manufacturing method of the first embodiment.

Furthermore, since the embodiment has a feature in the structure that seals the optical fiber and the case, only the optical fiber connecting in the optical waveguide package manufacturing process will be described in detail.

The manufacturing method of the embodiment includes: forming a bare fiber portion that is formed by partly removing a coating of the optical fiber so as to expose a bare fiber; applying Zn-containing solder to the bare fiber portion; forming a Zn-containing surface on the surface of the bare fiber portion by removing the Zn-containing solder; and inserting the optical fiber into the through hole and charging an Sn-containing sealing material between the Zn-containing surface and an inner wall of the through hole.

First, the optical fiber 31 which is connected to the optical waveguide package 100 is prepared.

In the optical fiber 31, generally, as shown in (a) of FIG. 3, since the coating 32 is formed up to the end portion of the fiber, the coating 32 of the end portion is removed by using a jacket remover, thereby forming the bare fiber portion 33 in which the bare fiber is exposed. As the jacket remover, a device that removes the coating 32 using a blade or a device that burns the coating 32 out using a $CO_2$ laser or the like may be used. As shown in FIG. 2A, the length of the bare fiber portion 33 to be formed is set so that the coating 32 is positioned outside the case 10 when the bare fiber portion is connected to the optical waveguide element 20.

Next, as shown in (b) of FIG. 3, the bare fiber portion 33 is dipped into a Zn-containing solder bath 51, so that Zn-containing solder is applied to the surface of the bare fiber portion 33. The Zn-containing solder bath 51 is formed by an ultrasonic wave bath filled with liquid-like Sn—Zn—Bi-based solder, liquid-like Sn—Zn—Al-based solder. When the bare fiber portion 33 is dipped into the Zn-containing solder bath 51, Zn-containing solder is attached onto the bare fiber portion 33 by the action of the applied ultrasonic wave and heat. Subsequently, when the bare fiber portion 33 is moved upward from the Zn-containing solder bath 51 and the solder is solidified, as shown in (c) of FIG. 3, Zn-containing solder 46 which covers the bare fiber portion 33 is formed.

Next, as shown in (c) of FIG. 3, when the Zn-containing solder 46 is dipped into the dissolution bath 52, the Zn-containing solder 46 on the bare fiber portion 33 is melted. The dissolution bath 52 is a bath into which a solution that melts solder such as nitric acid or hydrochloric acid containing catalyst is introduced.

Due to the dipping into the dissolution bath 52, most of the Zn-containing solder 46 is melted away. However, the surface of the bare fiber portion 33 has Zn which is strongly fixed to $SiO_2$ as a component of glass. Since most of Zn is not eluted, when the bare fiber portion 33 is moved upward from the dissolution bath 52, the Zn film 33z is formed on the surface thereof.

With the above-described process, the optical fiber 31 with the Zn film 33z on the surface of the bare fiber portion 33 may be manufactured.

Next, as shown in FIG. 2A, the bare fiber portion 33 provided with the Zn film 33z is inserted into the through hole 10a of the case 10, and then the end portion of the bare fiber portion 33 is inserted into the connection hole of the fiber fixture 23 of the optical waveguide element 20 which is mounted into the case 10. Accordingly, the optical fiber 31 and the optical waveguide element 20 are connected to each other.

At this time, although the surface of the bare fiber portion 33 is provided with the Zn film 33z, since the Zn film 33z is a very thin layer, there is no need to newly provide the fiber fixture 23 with a hole diameter set in consideration of the film thickness of the Zn film 33z, and the usual fiber fixture 23 which is formed according to the diameter of the bare fiber portion 33 may be used.

Next, in the through hole 10a, the soldering material 45 is charged between the Zn film 33z and the inner wall surface of the through hole 10a, thereby blocking the through hole 10a and forming the sealing portion 12.

In the embodiment, since the Zn film 33z is formed on the surface of the bare fiber portion 33, as the soldering material 45, Sn—Ag-based solder, Sn—In-based solder, Sn—Ag—Cu-based solder, Sn—Cu-based solder, Sn—Ag—In-based solder, Sn—Bi-based solder, or the like which is not easily attached to glass may be used. Even when such solder is used, since Sn contained in the soldering material 45 is metallically bonded to Zn of the Zn film 33z, they may be strongly bonded to each other.

The optical waveguide package which is manufactured according to the above-described manufacturing method was placed in the atmosphere of 85° C./85% RH for 500 hours, and then the moisture amount inside the case was measured. The moisture amount was 5000 ppm or less, and a satisfactory sealing property satisfying the standard according to Telcordia GR-468(*) was observed.

(*) Telcordia: Generic Reliability Assurance Requirements for Optoelectronic Devices Used in Telecommunications Equipment, GR-468-CORE (1998).

According to the manufacturing method of the above-described embodiment, through the simple process of sequentially dipping the bare fiber portion 33 into the Zn-containing solder bath 51 and the dissolution bath 52, the Zn film 33z may be formed on the surface of the bare fiber portion 33 and a satisfactory adhesion between the soldering material 45 and the bare fiber portion 33 may be obtained. Further, since the bare fiber portion is dipped into a liquid bath, many optical fibers 31 may be simultaneously processed. Accordingly, compared to a case where the Au-plated layer is patterned on the bare fiber portion 33 as in the related art, the process may be drastically simplified, and an expensive material such as Au which is used usually does not need to be used, thereby drastically reducing the manufacturing cost.

Further, since the satisfactory adhesion with respect to the Zn film 33z may be obtained even when solder which is not attached to glass is used as the soldering material 45 that seals the through hole 10a, an ultrasonic wave does not need to be applied to the soldering work, and hence the workability may be improved.

Further, in the above-described embodiment, a case has been described in which the Zn-containing solder bath 51 is used to form the Z film 33z, but the method of forming the Zn film 33z is not limited thereto.

For example, the Zn film or the Zn-alloy film is formed on the bare fiber portion 33 using a film forming method such as sputtering or CVD, the result is heated for the reaction between the surface of the bare fiber portion 33 and Zn so that a layer with Zn is formed, and then the Zn film or the Zn-alloy film is melted, thereby obtaining the Zn film 33z shown in (d) FIG. 3.

(Second Embodiment)

Next, a second embodiment will be described with reference to FIGS. 4A to 4C.

Figure 4A:
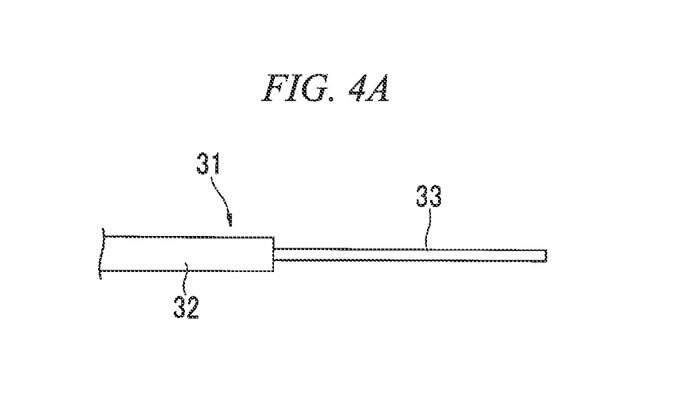
FIGS. 4A to 4C are diagrams illustrating an optical waveguide package manufacturing method according to a second embodiment.
Figure 4B:
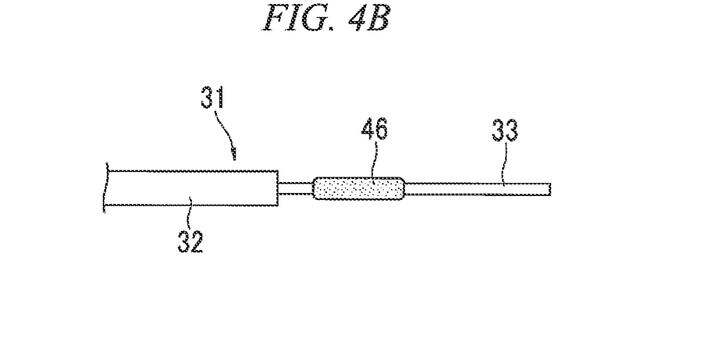
Figure 4C:
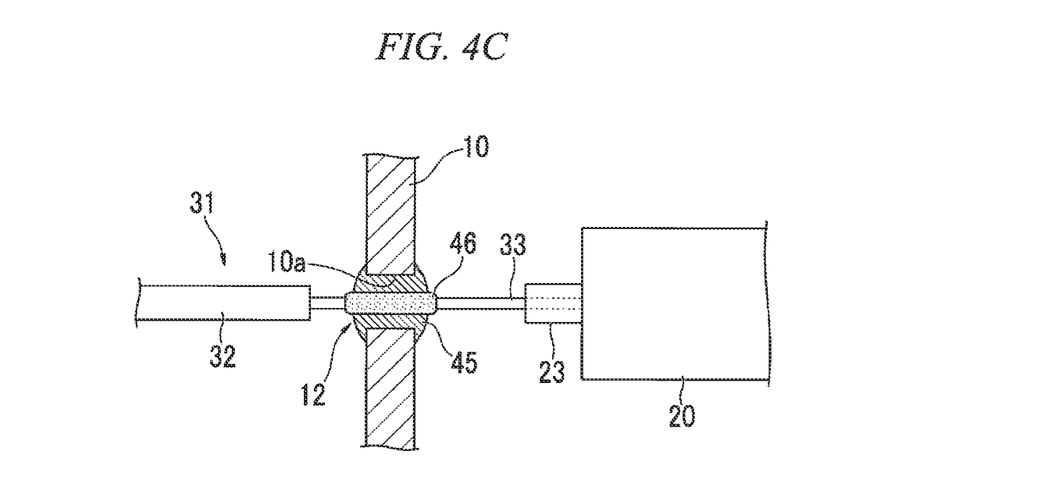

FIGS. 4A to 4C are diagrams illustrating an optical waveguide package manufacturing method according to the second embodiment.

The manufacturing method of the embodiment includes: forming the bare fiber portion 33 in which the bare fiber is exposed by partly removing the coating of the optical fiber 31; applying the Zn-containing solder 46 to the bare fiber portion 33; and inserting the optical fiber 31 into the through hole 10a of the case 10 and charging the Sn-containing soldering material 45 between the Zn-containing solder 46 on the bare fiber portion 33 and the inner wall of the through hole 10a.

First, as shown in FIG. 4A, the bare fiber portion 33 is formed in the optical fiber 31. The detailed procedure is the same as that of the above-described first embodiment.

Next, as shown in FIG. 4B, the Zn-containing solder 46 is partly applied to a predetermined position on the bare fiber portion 33 of the optical fiber 31. The Zn-containing solder 46 is solder which is attached to glass as in the above-described embodiment. For example, Sn—Zn—Bi-based solder or Sn—Zn—Al-based solder may be used. The method of applying the Zn-containing solder 46 is not particularly limited, and reflowing other than hand soldering may be performed.

By the above-described applying, comparatively thick Zn-containing solder 46 is formed on the surface of the bare fiber portion 33. However, the bare fiber portion 33 and Zn-containing solder 46 are strongly fixed to each other due to the application of ultrasonic waves and heat during the applying of solder.

Next, as shown in FIG. 4C, the bare fiber portion 33 provided with the Zn-containing solder 46 is inserted into the through hole 10a of the case 10, and then the end portion of the bare fiber portion 33 is inserted into the connection hole of the fiber fixture 23 of the optical waveguide element 20 which is mounted into the case 10. Accordingly, the optical fiber 31 and the optical waveguide element 20 are connected to each other. Furthermore, in the embodiment, since the Zn-containing solder 46 is not formed in the end portion of the bare fiber portion 33, the end portion may be inserted into the connection hole of the fiber fixture 23 without any difficulty.

Further, in the above-described inserting, the Zn-containing solder 46 on the bare fiber portion 33 is disposed inside the through hole 10a. Since the Zn-containing solder 46 may be formed on a surface of the bare fiber portion 33 which is other than the portion of the bare fiber portion 33 inserted into the fiber fixture 23, when the length in which the Zn-containing solder 46 is applied is set to be larger than the length of the through hole 10a, precise positioning is not needed.

Next, in the through hole 10a, the soldering material 45 is charged between the Zn-containing solder 46 and the inner wall surface of the through hole 10a, thereby blocking the through hole 10a and forming the sealing portion 12.

As the soldering material 45, the same soldering material as that of the above-described embodiment may be used. In the embodiment, since the Zn-containing solder 46 is applied onto the bare fiber portion 33, Sn—Ag-based solder, Sn—In-based solder, Sn—Ag—Cu-based solder, Sn—Cu-based solder, Sn—Ag—In-based solder, Sn—Bi-based solder, or the like which is not easily attached to glass may be used as the soldering material 45. Even when such solder is used, the Zn-containing solder 46 and the soldering material 45 are strongly fixed to each other.

Furthermore, the Zn-containing solder 46 may be partly or entirely melted while the soldering material 45 is charged, so that a sealing material integrated with the soldering material 45 is formed. Even when the Zn-containing solder 46 is melted in this way, since the surface of the bare fiber portion 33 has Zn which is strongly fixed to $SiO_2$, Zn is metallically bonded to Sn contained in the soldering material 45, so that they may be strongly bonded to each other.

The optical waveguide package which is manufactured according to the above-described manufacturing method was placed in the atmosphere of 85° C./85% RH for 500 hours, and then the moisture amount inside the case was measured. The moisture amount was 5000 ppm or less, and a satisfactory sealing property was observed.

According to the manufacturing method of the above-described embodiment, through the simple process of applying Zn-containing solder to a part of the bare fiber portion 33, the Zn-containing solder 46 may be formed on the surface of the bare fiber portion 33. Then, when the soldering material 45 is applied on to the Zn-containing solder 46, the soldering material 45 may be strongly bonded to the Zn-containing solder 46 or the soldering material 45 may be integrated with the Zn-containing solder 46 by melting, which may be strongly bonded to the bare fiber portion 33. Accordingly, the sealing portion 12 with a satisfactory sealing property may be formed by a simple process.

Accordingly, compared to a case where the Au-plated layer is patterned on the bare fiber portion 33 as in the related art, the process may be drastically simplified, and an expensive material such as Au which is used usually does not need to be used, thereby drastically reducing the manufacturing cost. Further, since solder which is not attached to glass may be used as the soldering material 45 that seals the through hole 10a, there is no need to apply ultrasonic waves to the soldering work, and the work and the process may be simplified.

(Third Embodiment)

Next, a third embodiment will be described by referring to FIGS. 5A and 5B.

Figure 5A:
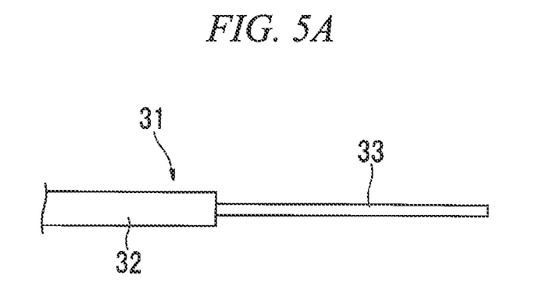
FIGS. 5A and 5B are diagrams illustrating an optical waveguide package manufacturing method according to a third embodiment.
Figure 5B:
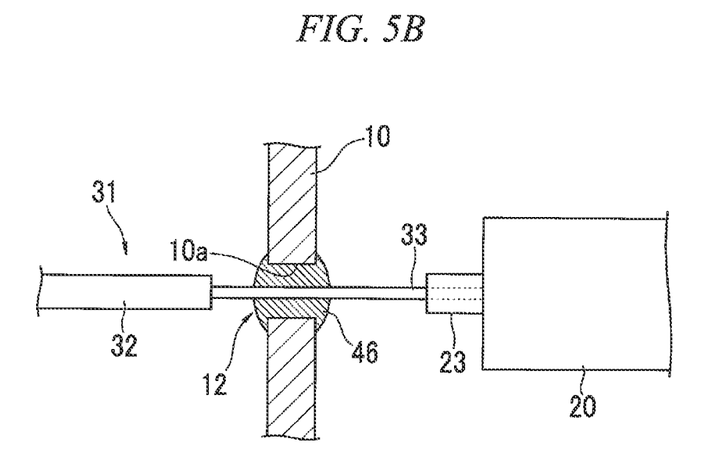

FIGS. 5A and 5B are diagrams illustrating a method of manufacturing an optical waveguide package according to the third embodiment.

The manufacturing method of the embodiment includes: forming the bare fiber portion 33 in which the bare fiber is exposed by partly removing the coating of the optical fiber 31; and inserting the optical fiber 31 into the through hole 10a of the case 10 and charging the Zn-containing solder 46 between the bare fiber portion 33 and the inner wall of the through hole 10a.

First, as shown in FIG. 5A, the bare fiber portion 33 is formed in the optical fiber 31. The detailed procedure is the same as that of the above-described first embodiment.

Next, as shown in FIG. 5B, the bare fiber portion 33 of the optical fiber 31 is inserted into the through hole 10a of the case 10, and then the end portion of the bare fiber portion 33 is inserted into the connection hole of the fiber fixture 23 of the optical waveguide element 20 which is mounted into the case 10. Accordingly, the optical fiber 31 and the optical waveguide element 20 are connected to each other. Furthermore, in the embodiment, since nothing is formed on the surface of the bare fiber portion 33, the end portion may be inserted into the connection hole of the fiber fixture 23 without any difficulty.

Next, in the through hole 10a, the Zn-containing solder 46 is charged between the bare fiber portion 33 and the inner wall surface of the through hole 10a. The Zn-containing solder 46 is solder which is attached to glass. For example, Sn—Zn—Bi-based solder or Sn—Zn—Al-based solder may be used. By charging the Zn-containing solder 46, the through hole 10a may be blocked and the sealing portion 12 may be formed.

In the embodiment, since ultrasonic waves and heat are applied to the solder while the Zn-containing solder 46 is charged, the bare fiber portion 33 and the Zn-containing solder 46 are strongly fixed to each other.

The optical waveguide package which is manufactured according to the above-described manufacturing method was placed in the atmosphere of 85° C./85% RH for 500 hours, and then the moisture amount inside the case was measured. The moisture amount was 5000 ppm or less, and a satisfactory sealing property was observed.

According to the manufacturing method of the above-described embodiment, the bare fiber portion 33 without Au-plating patterns is arranged to the case 10, and then the Zn-containing solder is charged thereinto, thereby forming the sealing portion 12. Accordingly, compared to a case where the Au-plated layer is patterned on the bare fiber portion 33 as in the related art, the process may be drastically simplified, and an expensive material such as Au which is used usually does not need to be used, thereby drastically reducing the manufacturing cost. However, it is necessary to apply ultrasonic waves to the soldering work in order to seal the through hole 10a using Zn-containing solder with poor wettability.

What is claimed is:

1. A structure that seals an optical device including
   a metallic case having an optical element disposed therein,
   an optical fiber which comprises a bare fiber and a coating which covers the surface of the bare fiber, wherein the optical fiber has a bare fiber portion having a terminal end, the bare fiber portion is formed by partly removing a coating of the optical fiber so as to expose a bare fiber, and the bare fiber portion is inserted in the metallic case through a through hole of the case, and
   a fiber fixture which is disposed in the case, has a connection hole, and connects a bare fiber of the optical fiber and the optical element,
   wherein a Zn-containing surface is formed on a surface of the bare fiber portion, the Zn-containing surface comprising a Zn-containing solder, wherein the Zn-containing solder comprises Sn-Zn-Bi based solder or Sn-Zn-Al based solder.
   wherein an Sn-containing sealing material is charged between the Zn-containing solder surface and an inner wall of the through hole such that the Sn-containing sealing material directly contacts the Zn-containing solder and the inner wall of the through hole, and
   wherein the terminal end of the bare fiber portion is inserted and fixed in the connection hole.

2. The structure that seals an optical device according to claim 1, wherein the through hole of the case is a hole which is provided in a side wall of the case.

3. The structure that seals an optical device according to claim 1,
   wherein the structure is formed by a method comprising:
   forming a bare fiber portion that is formed by partly removing a coating of the optical fiber so as to expose a bare fiber;
   applying Zn-containing solder to the bare fiber portion; and
   forming a Zn-containing surface on a surface of the bare fiber portion by removing the Zn-containing solder.

4. The structure that seals an optical device according to claim 3, wherein the step of applying Zn-containing solder to the bare fiber portion includes sub steps of
   dipping the bare fiber portion into a Zn-containing solder bath,
   raising the bare fiber portion from the Zn-containing solder bath to attach Zn-containing solder to the bare fiber portion, and
   solidifying the Zn-containing solder portion attached to the bare fiber portion, and the step of forming a Zn-containing surface on a surface of the bare fiber portion by removing the Zn-containing solder includes sub steps of:
   dipping the Zn-containing solder portion attached to the bare fiber portion in a dissolution bath which includes a solution that melts the Zn-containing solder, and
   raising the bare fiber portion from the dissolution bath to form a Zn film which has the Zn-containing surface.

5. The structure that seals an optical device according to claim 1, wherein the Zn-containing surface which is formed on a surface of the bare fiber portion is a Zn-containing surface of a Zn film.

6. The structure that seals an optical device according to claim 1, wherein the Sn-containing sealing material comprises an Sn-containing solder selected from the group consisting of: Sn—Ag-based solder, Sn—In-based solder, Sn—Ag—Cu-based solder, Sn—Cu-based solder, Sn—Ag—In-based solder and Sn—Bi-based solder.

* * * * *